United States Patent Office 2,800,184
Patented July 23, 1957

2,800,184
SELECTIVE PLUGGING PROCEDURE FOR IMPROVING SECONDARY RECOVERY OPERATIONS

Victor G. Meadors, Tulsa, Okla., assignor to Esso Research and Engineering Company, a corporation of Delaware No Drawing. Application February 9, 1953, Serial No. 335,977

4 Claims. (Cl. 166—9)

This invention concerns a novel secondary recovery procedure for oil production. The invention employs a novel plugging procedure for selectively plugging the more permeable strata of an oil production zone to permit better oil recovery under the influence of secondary recovery drives. To achieve this objecitve a temporary plugging agent is employed capable of plugging the portions of a formation having the lowest permeability. As a second step of the procedure a permanent plugging agent is employed which is used to seal off the portions of a formation having the highest permeability. Thereafter the temporary plugging agent is removed from the low permeability strata and conventional secondary recovery fluid drives are employed.

In the production of oil from petroleum wells a first phase of production is ordinarily called primary production. During this phase of oil production, natural reservoir pressure is depended on to drive the oil to the surface of the earth. As this continues, both the oil and the pressure are depleted, leaving as much as ⅔ of the oil in the earth and necessitating different recovery techniques. To recover this oil which cannot be economically obtained by the methods of primary production, so-called secondary recovery techniques may be used. Employing secondary recovery, injection wells are spaced in and about production wells in selected patterns. Water or other fluids are injected through the injection wells and are forced through the formation to drive oil to the production wells. A recognized problem in secondary recovery arises due to differences in permeability throughout the oil reservoir. Thus, most reservoirs are non-homogeneous in character and exhibit permeability differences in both horizontal and vertical planes. As a result of this factor, in water flooding, for example, the following problem occurs. When injecting water to flow through the reservoir this water will of course preferentially follow strata having the greatest permeability. As a result, oil will be preferentially driven from the highly permeable strata so that water flowing therethrough will eventually reach production wells in substantial quantities. This is exhibited by an increase in the water to oil ratio obtained during the secondary recovery operation. In many cases the water to oil ratio becomes so high as to prohibit further attempts to produce oil from the particular reservoir. Nonetheless, it is known that a substantial quantity of oil may still be present in the reservoir, contained in strata of lower permeability through which water did not effectively penetrate in the drive process.

There have been many suggestions for attempting to solve this problem. It has been suggested and in some cases it is practical to mechanically pack or choke high permeability strata in the attempt to equalize the permeability profile of the strata throughout the formation. This procedure is difficult to employ successfully however, as great precision in placing the packers or chokes opposite the proper strata is required. Again, in many cases the inter-leaving of low and high permeability strata makes any mechanical packing or choking arrangement unsuitable.

Another approach to the problem has been to employ selective plugging agents adapted to preferentially seal off the more permeable strata of a reservoir. A variety of agents have been suggested of a character suitable for this objective. For the most part these agents are applied on the theory that a fluid solution of the agents will preferentially flow through the highly permeable portions of a reservoir so as to place the sealing agents in position to seal off the highly permeable strata. This has the obvious weakness however, that low permeability strata may also be inadvertently sealed off. In some cases a formation may be completely blocked off in the attempt to seal only the high permeability regions.

This invention is related to the conventional selective sealing procedures referred to in which sealing agents are used to preferentially plug the more permeable portions of a reservoir. However, the invention provides a practical solution to the problem of avoiding sealing of the low permeability strata. This is achieved by first sealing the low permeability strata with a temporary sealing agent, so as to protect the low permeability strata against penetration of the sealing agent intended to plug high permeability strata. The protective sealing agent for the low permeability strata is preferably of a character to seal only the surface of the strata exposed to the flooding action. This factor coupled with the water-dispersable character of the temporary sealing agent permits ready elimination of the guarding seal when desired.

In employing this invention a number of processing steps are required. In a first step of the process, conventional secondary recovery water flooding is preferably employed. This is conducted until the ratio between produced oil and the flooding agent at production wells becomes undesirable. The preliminary flooding, in removing oil from the vicinity of the injection wells, pre-conditions the reservoir for the treatment of this invention.

The formation having been pre-conditioned as indicated, the temporary sealing agent to be used is then pumped down the injection wells. The sealing agent to be used in this step of the process is preferably an oil-soluble, water-dispersible, compound having the property of plugging small pores while passing unrestricted through larger pores. Suitable materials are described hereinafter. On injection, a compound of the nature referred to will encounter all strata present in the formation. However, due to the nature of this compound, only the strata of low permeability will be sealed as the compound will pass through the pores of the more permeable strata.

Having injected the temporary sealing material, injection of a conventional plugging agent may then be carried out. An ordinary quick-setting cement may be used, for example, in aqueous solution. On injection of this material, the aqueous solution being barred from the low permeability strata, will flow solely through the highly permeable strata so as to thoroughly impregnate and seal these strata to the extent desired.

Thereafter, an agent is injected capable of removing the temporary sealing agent first used to seal off the low permeability strata. As the sealing agent preferably employed for this purpose is oil-soluble and water dispersible, either water or oil may be used to remove this compound. In the event water is employed, it is particularly preferred to use hot water, since this will serve to most readily remove the water-dispersible compounds. Crude oil or any other petroleum fraction will also serve to readily eliminate the sealing agent from the low permeability strata. It is possible to practice the invention by simply injecting the flooding agent which is employed during secondary recovery, depending upon the flood front to remove the temporary seal from the low permeability strata. This is particularly true when propane or a similar low molecular weight hydrocarbon is employed as the flooding agent.

Having followed these steps of the process, the conventional flooding procedures may be followed. At this stage of the process the highly permeable strata will be effectively sealed off and the low permeability strata will be freed from sealing agent. As a result, it will now be possible to waterflood the low permeability section of the reservoir without encountering objectionable water to oil ratios.

As indicated above, a wide variety of water-dispersible compounds may be used in the step of the process in which low permeability strata are temporarily plugged. The compound selected is also, preferably, oil-soluble. Surface active materials forming micelles of sufficient size to plug low permeability strata are particularly desirable. Examples of these compounds are 1-hydroxyethyl-2-heptadecenyl-2-imidazoline, 1-oleyl-4,4-di-methoxy-2-oxazoline, polyoxyethylene sorbitan trioleate, and the sodium salt of the di-(tri-decyl) ester of sulfo succinic acid. A class of compounds of this nature which are particularly effective are substituted ammonium compounds having large hydrophobic groups in the molecule. Distearyl dimethyl ammonium chloride is a particularly effective compound of this class for the practice of this invention.

The preferred class of compounds in this procedure are the quaternary ammonium compounds

where $R_1$, $R_2$, $R_3$ and $R_4$ are hydrophobic organic radicals, at least one of which contains at least twelve carbon atoms, and X is a monovalent anion which may be either organic or inorganic.

Another class of compounds which may be employed in the present invention are the alkyl oxazolines

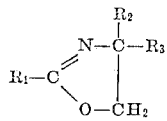

where $R_1$ is an alkyl, alkenyl or aryl-alkyl group containing at least twelve carbon atoms and $R_2$ and $R_3$ are hydrophilic groups selected from the class consisting of the methyl, hydroxymethyl and hydroxyethyl radicals.

A third class of useful compounds consists of the substituted imidazolines

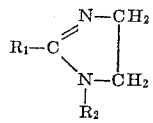

where $R_1$ is an alkyl, aryl-alkyl or alkenyl radical containing at least twelve and preferably more than twelve carbon atoms and $R_2$ is selected from the class consisting of the methyl, hydroxymethyl and hydroxyethyl radicals.

The most suitable compounds in these classes will be those which are not soluble in water to the extent of more than 0.5 percent by weight and which will be soluble in aliphatic or aromatic hydrocarbons to the extent of at least 0.5 percent by weight. These compounds will normally be employed as aqueous solutions or dispersions containing from 0.1 percent to 20 percent by weight and preferably from 1 percent to 10 percent by weight.

As an example of this invention, tests were conducted employing sandstone of different permeabilities. A 1/10% aqueous solution of distearyl dimethyl ammonium chloride was prepared. It was found that this solution readily plugged a sandstone of 75 md. permeability, while having no effect on sandstone having a permeability above 400 md. Furthermore, it was found that this sealing action was confined to the surface of the sandstone and could be readily overcome by washing with water or a hydrocarbon solvent.

The following is an example of the manner in which this invention may be applied to a petroleum reservoir. At least one water injection well and one oil producing well have been drilled into the reservoir, the productive section of which consists of two sandstone strata which may or may not be interconnected. One of these strata has a dry air permeability of 75 md. or less while the second has a dry air permeability of 400 md. or greater. The injection of water into such a reservoir will give some production from each stratum, but because of the greater permeability, at least six times as much water will enter the 400 md. zone as enters the 75 md. sand. This ratio will be even larger after water has broken through the 400 md. sand into the producing well, so that the average oil saturation in the 75 md. sand will not have been decreased very much by water-flooding up to this point.

When oil production has dropped to a point near the minimum economic value, a 0.1 percent aqueous solution of dimethyl distearyl ammonium chloride is injected into the water injection well. Most of this solution will pass into the more permeable stratum where it will exert no plugging effect; some of the solution, however, will pass into the 75 md. stratum and, as shown by the laboratory tests, will plug this stratum. When plugging is judged to be complete, a cement slurry is pumped into the more permeable section which has remained open and is allowed to set there, forming a permanent plug. The bore hole is then cleaned out by washing the same with hot water or with a hydrocarbon solvent which will remove the temporary plugging agent, i. e. the dimethyl distearyl ammonium chloride, from the low permeability stratum. After the temporary plug has been removed the 75 md. sand, which still contains a relatively large quantity of oil, will be open and water can be injected into that sand to recover the oil present therein, this oil not having been recoverable to any appreciable extent previous to the plugging treatment described because of the much greater permeability of the 400 md. sand, which has now been sealed off.

As described therefore, this invention concerns a selective plugging procedure in which a temporary plugging agent capable of sealing only the least permeable strata of a formation is first injected. Thereafter, a conventional sealing agent is employed which necessarily plugs only the more permeable strata of the formation. On then removing the temporary sealing agent, conventional flooding procedures may be used. The permanent plugging agent to be used, following injection of the temporary plugging agent, may be chosen from those known to the art. Suitable examples of permanent plugging agents are Portland cement and phenol-aldehyde resins.

What is claimed is:
1. A secondary recovery process for recovering oil from a subterranean formation which is penetrated by at least one injection well and at least one production well and which includes a stratum having a permeability of the order of about 75 millidarcies and a stratum having a permeability of the order of about 400 millidarcies which comprises injecting a fluid flooding agent into the reservoir via the injection well to displace oil preferentially from the stratum of relatively high permeability into the production well, thereafter injecting an aqueous dispersion of distearyl dimethyl ammonium chloride into the reservoir via the injection well in a quantity sufficient to plug preferentially the stratum of relatively high permeability, thereafter injecting a sealing agent of a permanent type into the reservoir via the injection well to permanently plug the stratum of relatively high permeability, removing the temporary plugging agent from the stratum of relatively low permeability by contacting said stratum with an agent selected from the class consisting of water and oil, and thereafter injecting a fluid flooding agent into the reservoir via the injection well to displace oil preferentially from the stratum of relatively low permeability into the production well.

2. A process as defined in claim 1 in which the fluid flooding agent is water.

3. A process as defined in claim 1 in which the temporary plugging agent is a .1 percent aqueous solution of distearyl dimethyl ammonium chloride.

4. A process as defined in claim 1 in which the permanent plugging agent is Portland cement.

References Cited in the file of this patent

UNITED STATES PATENTS

| | | |
|---|---|---|
| 2,223,804 | Kennedy | Dec. 3, 1940 |
| 2,272,673 | Kennedy | Feb. 10, 1942 |
| 2,402,588 | Andresen | June 25, 1946 |
| 2,543,868 | Prokop | Mar. 6, 1951 |
| 2,546,252 | Bankson | Mar. 27, 1951 |